(12) United States Patent
Noland

(10) Patent No.: US 12,302,773 B1
(45) Date of Patent: May 20, 2025

(54) PORTABLE ROLLER GROOVER ASSEMBLY

(71) Applicant: Chase Noland, Tallulah, LA (US)

(72) Inventor: Chase Noland, Tallulah, LA (US)

( * ) Notice: Subject to any disclaimer, the term of this patent is extended or adjusted under 35 U.S.C. 154(b) by 667 days.

(21) Appl. No.: 17/117,167

(22) Filed: Dec. 10, 2020

(51) Int. Cl.
*A01B 73/00* (2006.01)
*A01B 29/04* (2006.01)
*A01B 59/04* (2006.01)

(52) U.S. Cl.
CPC .......... *A01B 73/005* (2013.01); *A01B 29/045* (2013.01); *A01B 59/04* (2013.01)

(58) Field of Classification Search
CPC ..... A01B 73/005; A01B 29/045; A01B 63/22; A01B 59/04; A01B 29/06
USPC ...................................................... 172/625
See application file for complete search history.

(56) References Cited

U.S. PATENT DOCUMENTS

| | | | | |
|---|---|---|---|---|
| 66,861 A * | 7/1867 | Mains | ................... | A01B 73/005 172/240 |
| 305,923 A * | 9/1884 | Hering et al. | ....... | A01B 73/005 172/240 |
| 1,190,849 A * | 7/1916 | Berriman | ................. | A01G 7/00 43/132.1 |
| 2,833,105 A | 5/1958 | Naery | | |
| 3,525,537 A * | 8/1970 | Honnold | ................ | A01B 73/00 172/625 |
| 3,613,925 A * | 10/1971 | Stum | ................... | A01D 75/002 212/326 |
| 3,885,633 A * | 5/1975 | van der Lely et al. | ...................... | A01B 73/005 172/111 |
| 3,901,327 A * | 8/1975 | Mitchell | ................ | A01B 21/08 172/625 |
| 4,026,365 A * | 5/1977 | Andersson et al. | . | A01B 73/005 172/625 |
| 4,450,918 A * | 5/1984 | Danford | ............... | A01B 73/005 172/417 |
| 4,569,296 A | 2/1986 | Miller et al. | | |
| 4,821,811 A * | 4/1989 | Swenson | ............. | A01B 73/005 280/43.23 |
| 5,460,229 A * | 10/1995 | Mattis | .................... | A01B 45/02 172/776 |
| 5,525,012 A * | 6/1996 | Casimaty et al. | ..... | A01G 20/18 111/901 |

(Continued)

FOREIGN PATENT DOCUMENTS

DE 10137407 A1 * 2/2003 ........... A01B 73/005

*Primary Examiner* — Christopher J Sebesta
*Assistant Examiner* — Joel F. Mitchell
(74) *Attorney, Agent, or Firm* — R. Keith Harrison

(57) ABSTRACT

A portable roller groover assembly may include an assembly frame. At least one wheel unit may be provided on the assembly frame. The wheel unit may have at least one wheel selectively deployable in an extended position to deploy the assembly frame in a towing configuration and a retracted position to deploy the assembly frame in a grooving configuration. A towing hitch interface may be provided on the assembly frame. The towing hitch interface may be configured to facilitate coupling of a towing vehicle to the assembly frame in the towing configuration. A grooving hitch interface provided on the assembly frame may be configured to facilitate coupling of the towing vehicle to the assembly frame in the grooving configuration. A groover on the assembly frame may have a plurality of spaced-apart groover disks.

11 Claims, 14 Drawing Sheets

(56) References Cited

U.S. PATENT DOCUMENTS

| | | |
|---|---|---|
| 7,197,865 B1 | 4/2007 | Enns et al. |
| 8,333,249 B1 | 12/2012 | Minton et al. |
| 8,887,825 B2 * | 11/2014 | Valier .................... A01B 29/06 |
| | | 172/260.5 |
| 9,545,049 B2 | 1/2017 | Barnett et al. |
| 9,565,800 B2 | 2/2017 | Fay, II et al. |
| 2020/0196512 A1 * | 6/2020 | Deng et al. .......... A01B 79/005 |

* cited by examiner

PORTABLE ROLLER GROOVER ASSEMBLY

FIELD

Illustrative embodiments of the disclosure generally relate to agricultural implements and operations. More particularly, illustrative embodiments of the disclosure relate to a portable roller groover assembly which can be selectively coupled to a towing vehicle for transport and alternatively coupled to the towing vehicle for implementation in a soil grooving operation.

SUMMARY

Illustrative embodiments of the disclosure are generally directed to a portable roller groover assembly suitable for coupling to a towing vehicle in a towing configuration and alternative coupling to the towing vehicle in a grooving configuration. An illustrative embodiment of the portable roller groover assembly may include an assembly frame having a frame front, a frame rear, a leading frame end and a trailing frame end, the assembly frame disposed within a frame plane. At least one wheel unit may be provided on the assembly frame. The at least one wheel unit may have at least one wheel selectively deployable in an extended position to deploy the assembly frame in the towing configuration and a retracted position to deploy the assembly frame in the grooving configuration. A towing hitch interface may be provided on the assembly frame at the leading frame end. The towing hitch interface may be configured to facilitate coupling of the towing vehicle to the assembly frame in the towing configuration. A grooving hitch interface may be provided on the assembly frame at the frame front. The grooving hitch interface may be configured to facilitate coupling of the towing vehicle to the assembly frame in the grooving configuration. A groover may be provided on the assembly frame. The groover may have a plurality of spaced-apart groover disks disposed at least partially beyond the frame plane of the assembly frame.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
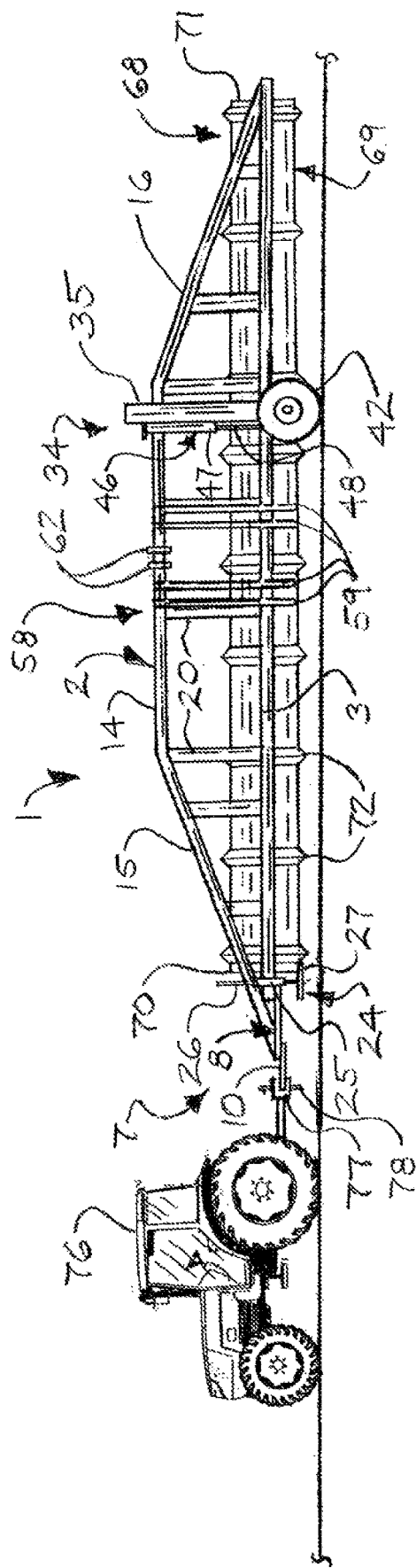
FIG. 11 is a front view of the illustrative portable roller groover assembly, coupled to a towing vehicle in the towing configuration for transport of the assembly.
Figure 14:
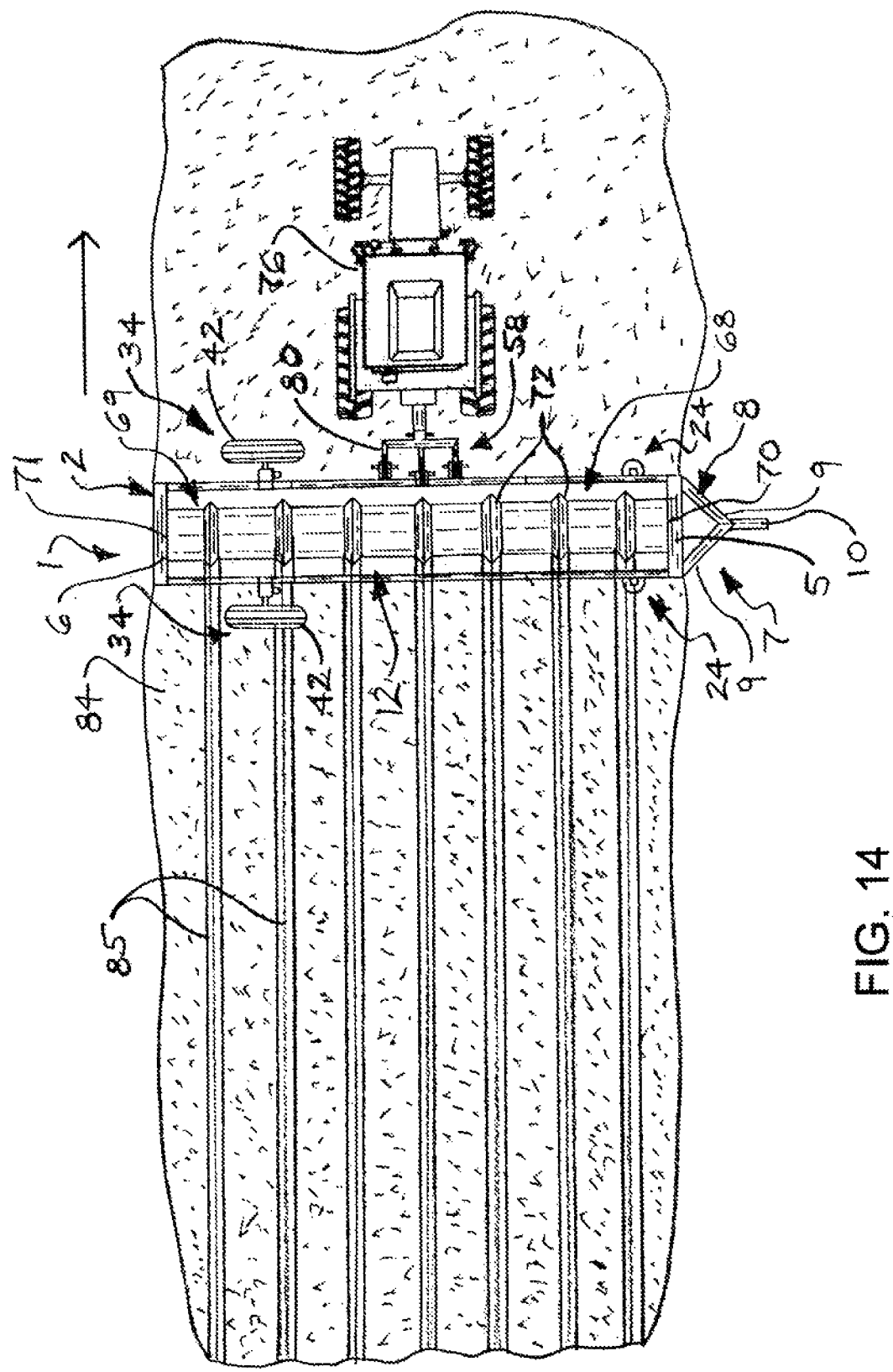
FIG. 14 is a top view of the illustrative portable roller groover assembly, coupled to the towing vehicle and towed on soil to form furrows in the soil in a typical soil grooving operation of the assembly

Referring initially to FIGS. 11 and 14 of the drawings, an illustrative embodiment of the portable roller groover assembly, hereinafter assembly, is generally indicated by reference numeral 1. As will be hereinafter described, the assembly 1 may be selectively deployable in a towing configuration (FIG. 11) to facilitate towing transport of the assembly 1 behind a tractor or other towing vehicle 76. The assembly 1 may be alternatively deployable in a grooving configuration (FIG. 14) to facilitate operation of the assembly 1 in a soil grooving operation as the assembly 1 is towed on soil 84 behind the towing vehicle 76. In the soil grooving operation, the assembly 1 may form multiple grooves or furrows 85 in the soil 84 typically for planting, irrigation and/or other purposes.

Figure 5:
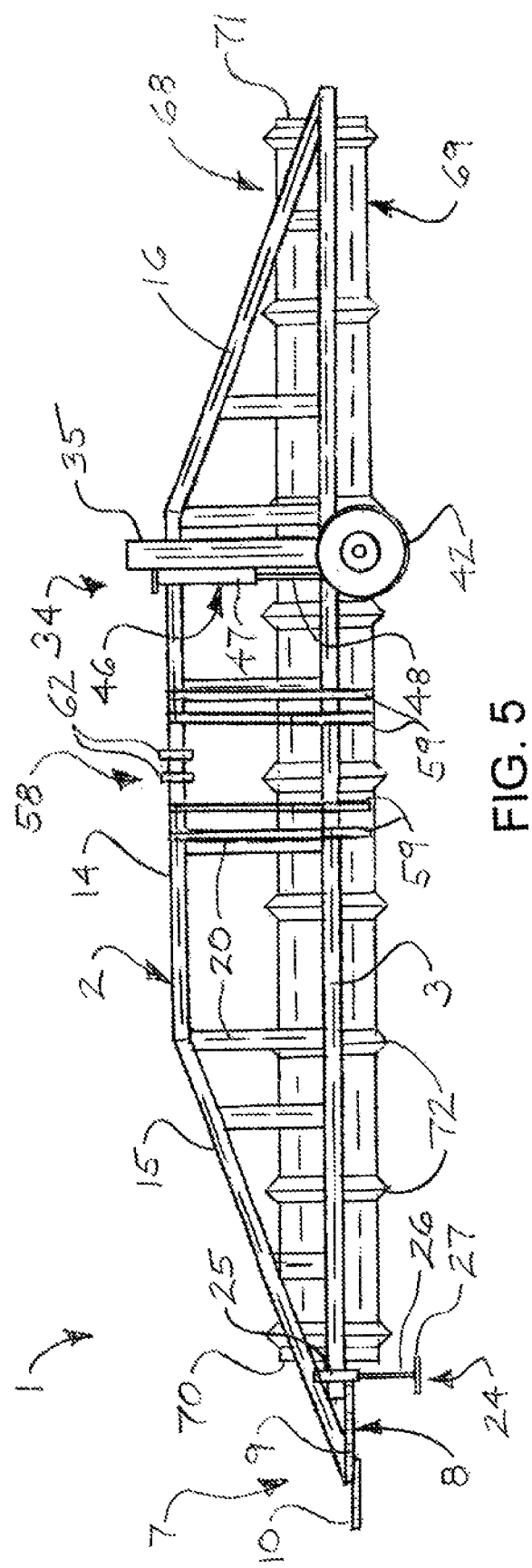
FIG. 5 is a front view of the illustrative portable roller groover assembly in the towing configuration.
Figure 6:
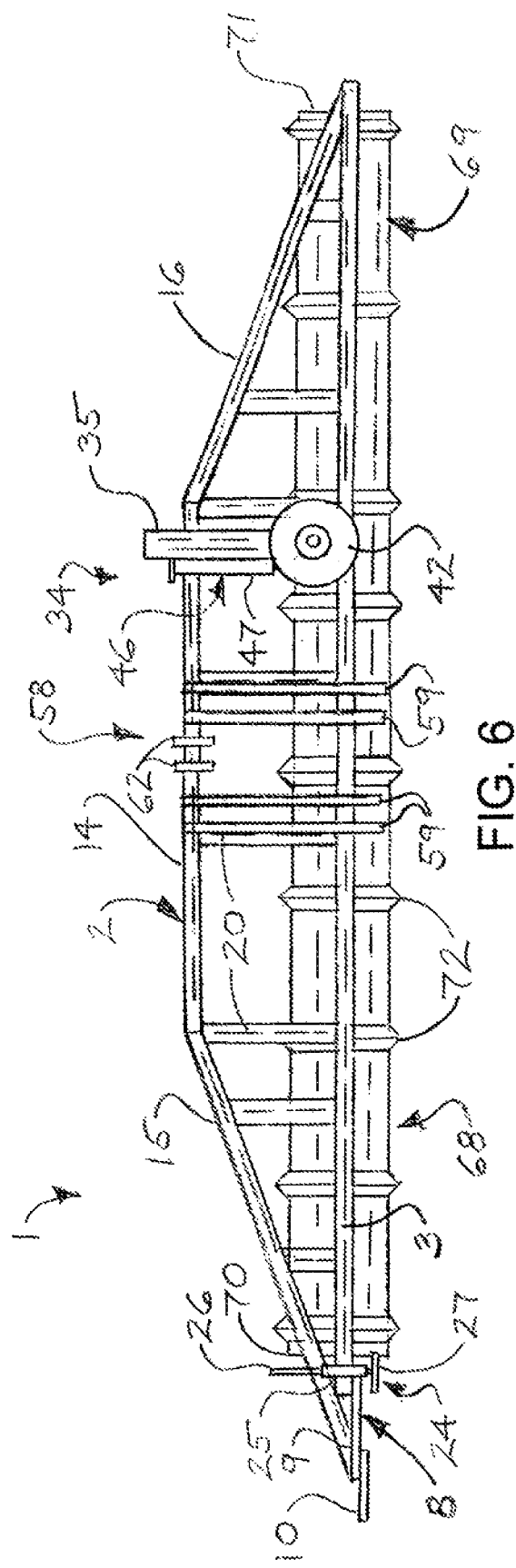
FIG. 6 is a front view of the illustrative portable roller groover assembly in the grooving configuration.
Figure 7:
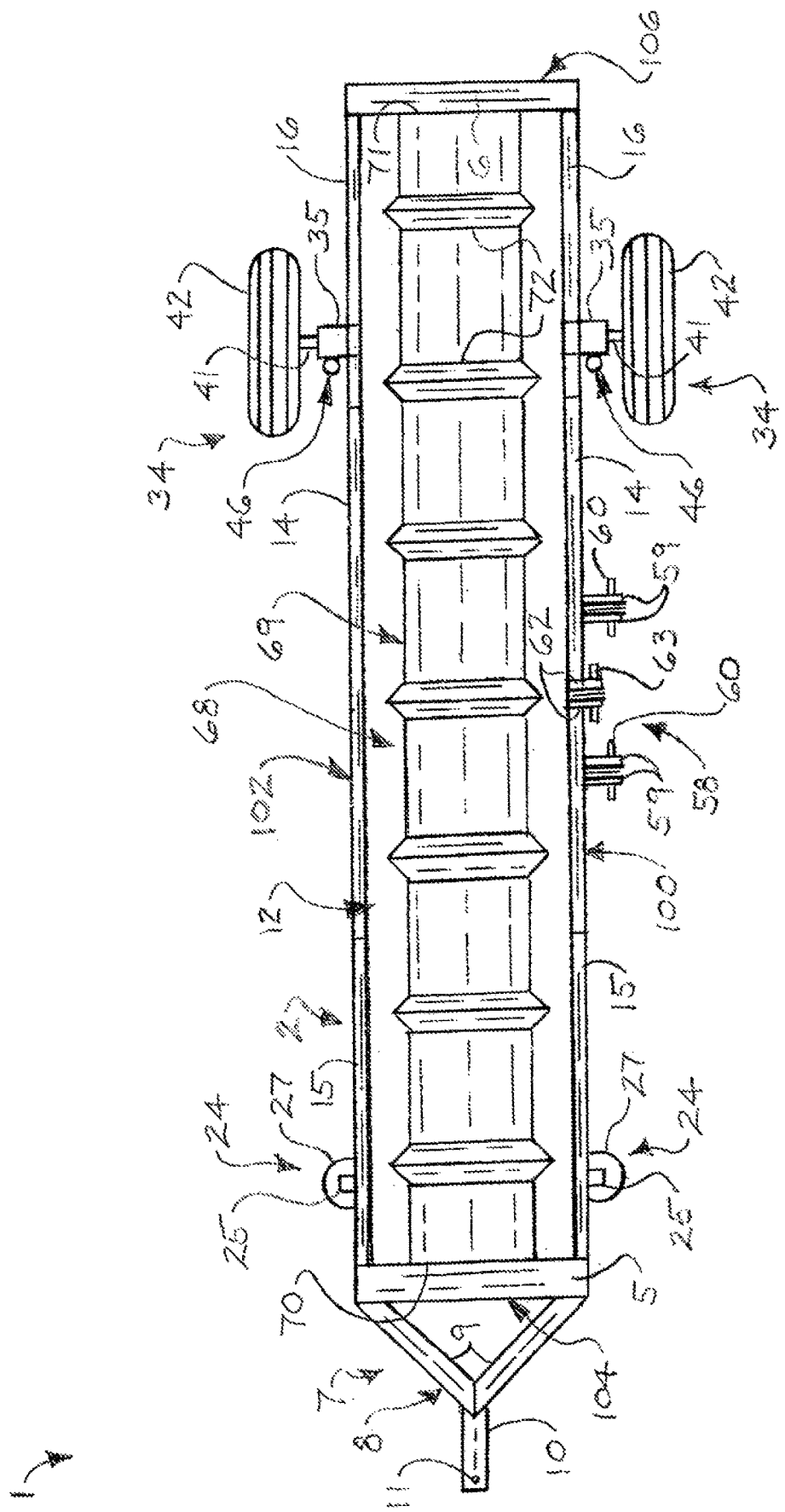
FIG. 7 is a top view of the illustrative portable roller groover assembly.

Referring next to FIGS. 1-10 and 15 of the drawings, the assembly 1 may include an assembly frame 2. As illustrated in FIG. 7, in some embodiments, the assembly frame 2 may be elongated and rectangular with a frame front 100, a frame rear 102, a leading frame end 104 and a trailing frame end 106. The assembly frame 2 may have a frame interior 12.

Figure 2:
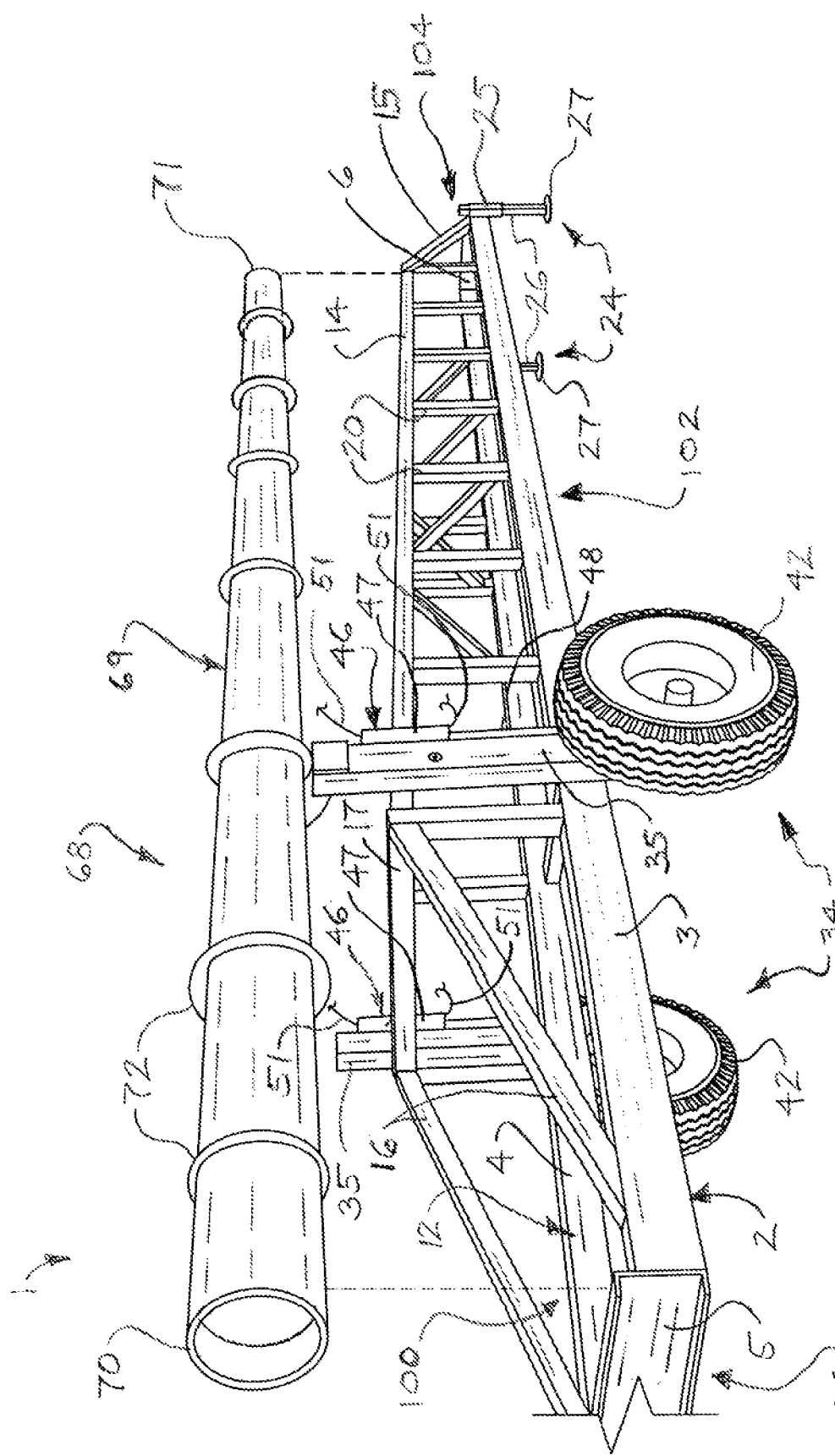
FIG. 2 is an exploded front perspective view, partially in section, of the illustrative portable roller groover assembly, with a groover shown detached from an assembly frame of the assembly.
Figure 8:
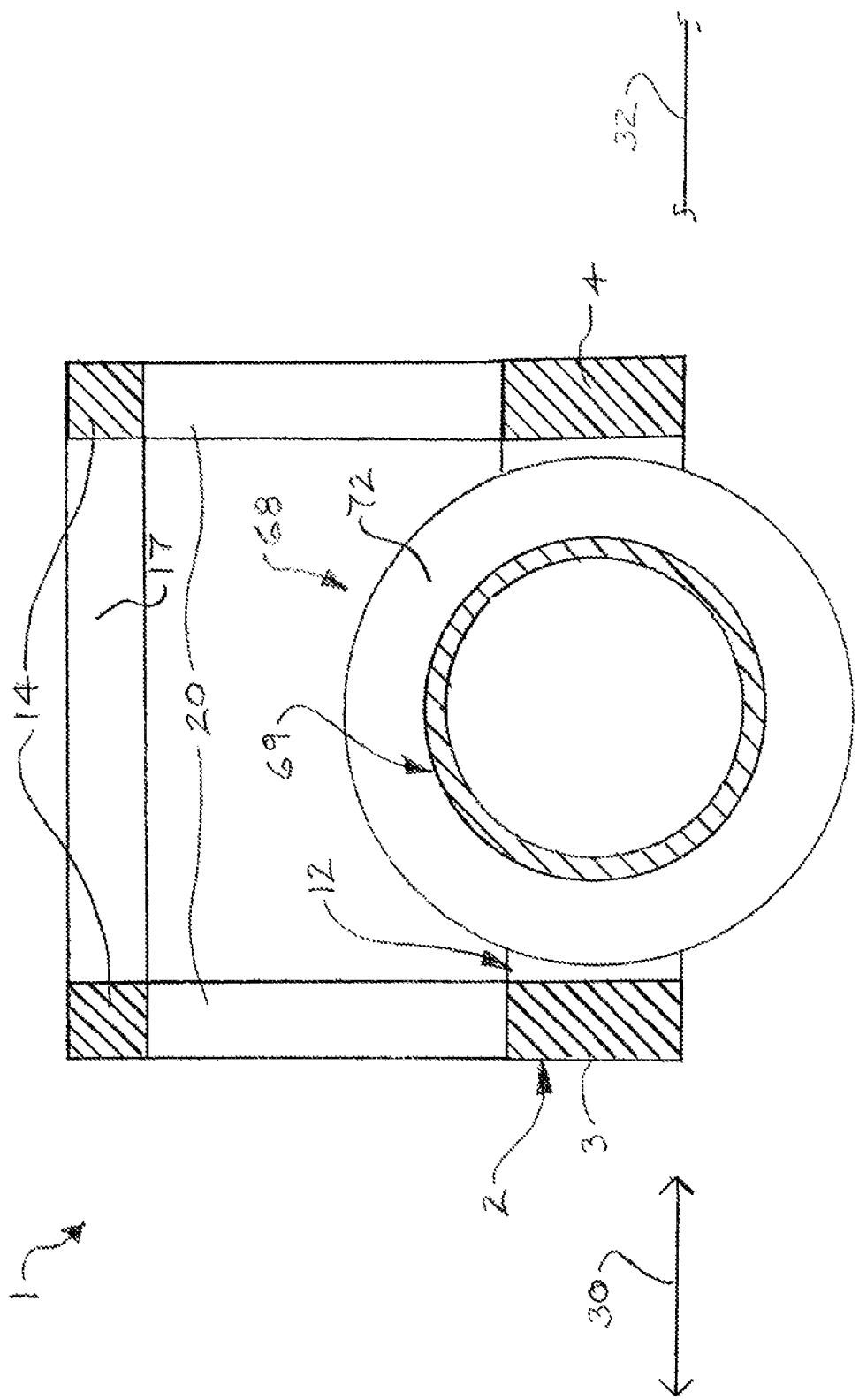
FIG. 8 is a cross-sectional view, taken along section lines 8-8 in FIG. 1.

As illustrated in FIG. 2, the assembly frame 2 may have an elongated front base frame member 3 at the frame front 100. An elongated rear base frame member 4 may be disposed in parallel, spaced-apart relationship to the front base frame member 3 at the frame rear 102. A leading end frame member 5 and a trailing end frame member 6 may extend between the front base frame member 3 and the rear base frame member 4 at the leading frame end 104 and the trailing frame end 106, respectively. The frame interior 12 may be formed by and between the front base frame member 3, the rear base frame member 4, the leading end frame member 5 and the trailing end frame member 6. As illustrated in FIG. 8, the front base frame member 3, the rear base frame member 4, the leading end frame member 5 and the trailing end frame member 6 of the assembly frame 2 may be disposed within a frame plane 30.

In some embodiments, a pair of upper frame members 14 may extend above and in parallel relationship to the respective front base frame member 3 and rear base frame member 4. A pair of sloped leading frame members 15 may angle forwardly from the respective upper frame members 14 to the frame front 100 of the assembly frame 2. As illustrated in FIG. 2, in some embodiments, the forward ends of the sloped leading frame members 15 may terminate on the respective front base frame member 3 and rear base frame member 4 at or adjacent to the leading end frame member 5. A pair of sloped trailing frame members 16 may angle from the upper frame members 14, respectively, to the trailing frame end 106 of the assembly frame 2. In some embodiments, the trailing ends of the sloped trailing frame members 16 may terminate on the respective front base frame member 3 and rear base frame member 4 at or adjacent to the trailing end frame member 6.

Figure 3:
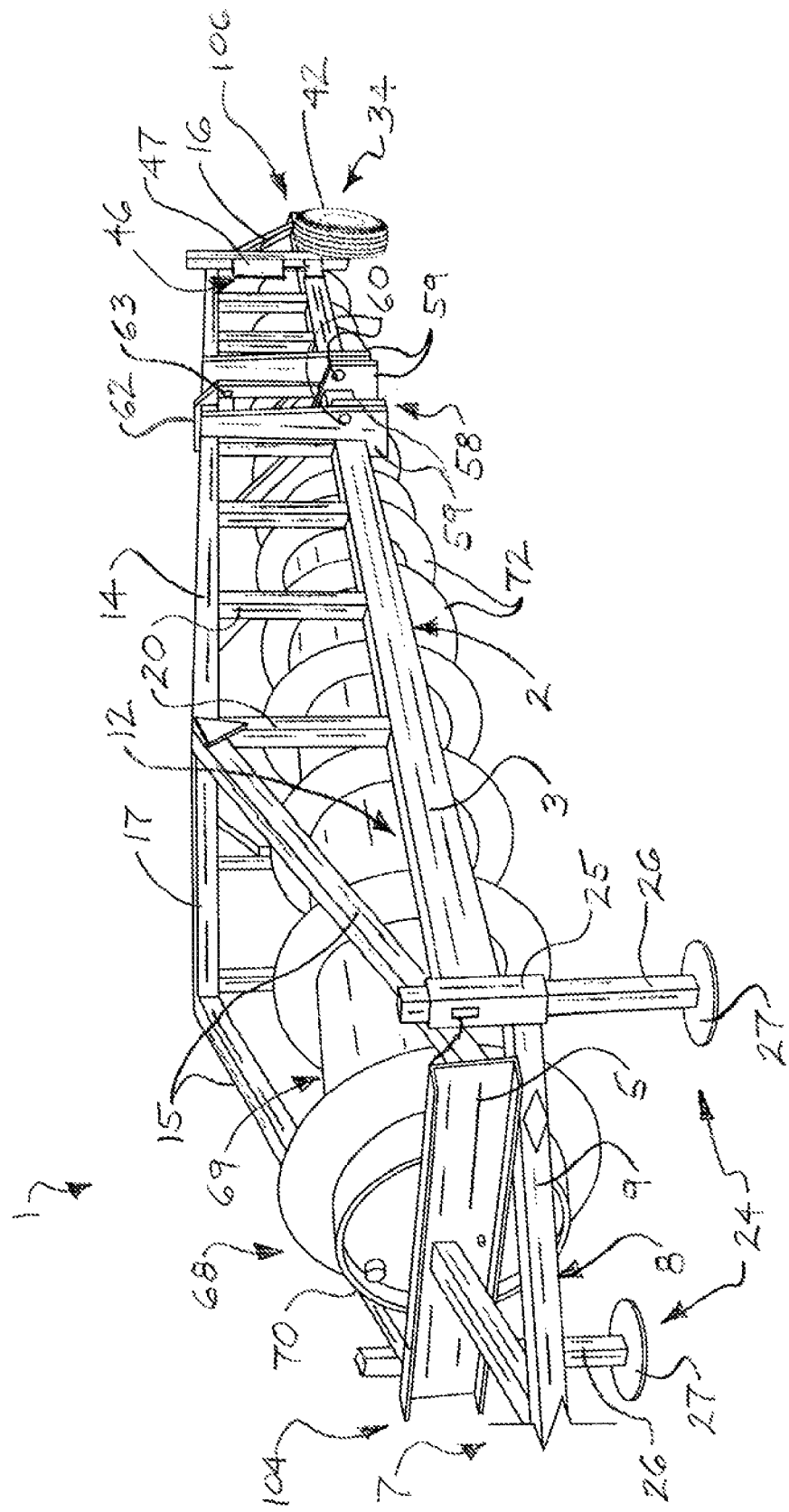
FIG. 3 is a front perspective view of the illustrative portable roller groover assembly deployed in a raised, towing configuration.

At least one vertical frame member 20 may extend between each upper frame member 14 and each corresponding one of the front base frame member 3 and the rear base frame member 4. As illustrated in FIGS. 2 and 3, in some embodiments, at least one transverse frame member 17 may extend between the upper frame members 14, the sloped leading frame members 15 and/or the sloped trailing frame members 16.

Figure 10:
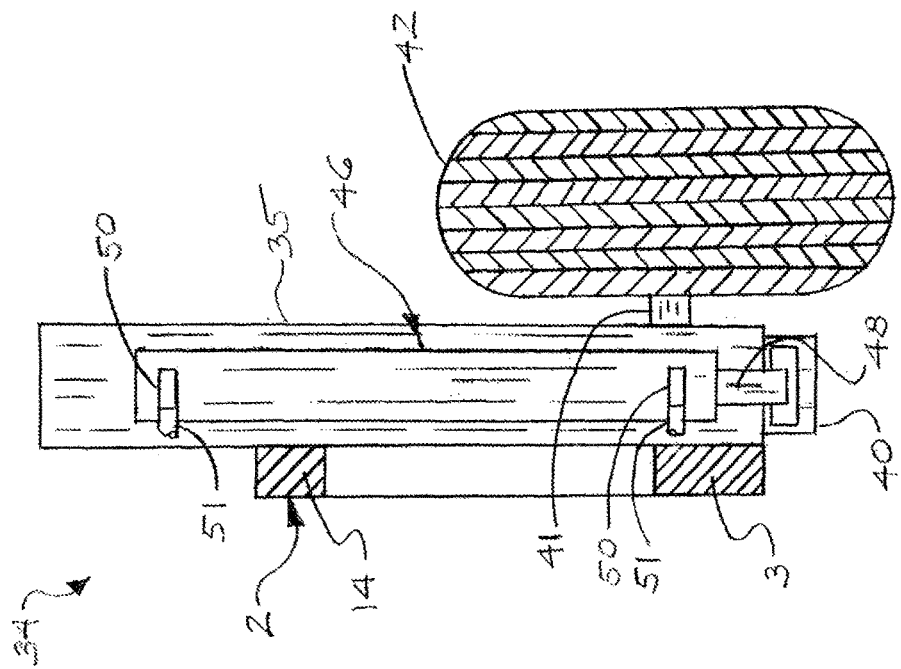
FIG. 10 is a front view of the wheel unit of the portable roller groover assembly illustrated in FIG. 9, deployed in a retracted position to dispose the assembly frame and groover in the grooving configuration.
Figure 9:
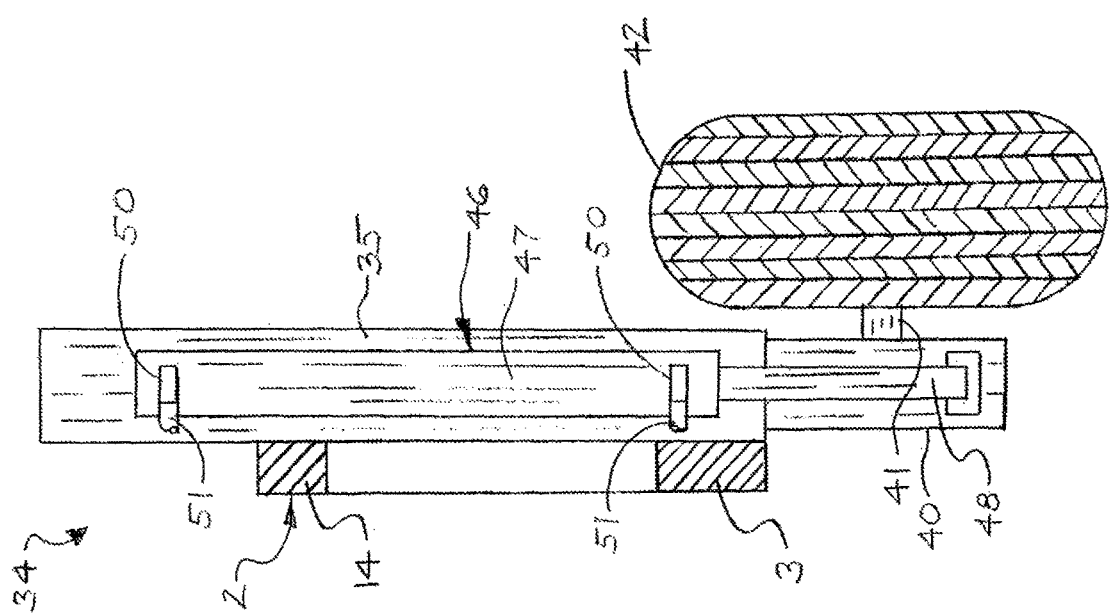
FIG. 9 is a front view of a typical wheel unit of the illustrative portable roller groover assembly, mounted on the assembly frame (shown in section) and deployed in an extended position to dispose the assembly frame and groover of the portable roller groover assembly in the towing configuration.

At least one, and typically, a pair of wheel units 34 may be provided on the assembly frame 2. In some embodiments, a wheel unit 34 may be provided at each of the frame front 100 and the frame rear 102 of the assembly frame 2. As illustrated in FIGS. 9 and 10, each wheel unit 34 may include a wheel frame housing 35. The wheel frame housing 35 may be provided on each corresponding one of the front base frame member 3, as illustrated, and the rear base frame member 4 of the assembly frame 2. A wheel frame 40 may be telescopically extendable from the wheel frame housing 35. A wheel actuator 46 may be provided on the wheel frame housing 35. The wheel actuator 46 may operably engage the wheel frame 40 to facilitate telescopic extension and retraction of the wheel frame 40 with respect to the wheel frame housing 35 according to the knowledge of those skilled in the art.

The wheel actuator 46 may include any device or combination of devices operational to facilitate selective extension of the wheel frame 40 from the wheel frame housing 35 (FIG. 9) and retraction of the wheel frame 40 into the wheel frame housing 35 (FIG. 10). In some embodiments, the wheel actuator 46 may include a hydraulic actuator cylinder 47 and an actuator piston 48 extendable from the actuator cylinder 47. The actuator cylinder 47 may be attached to the wheel frame housing 35 and the actuator piston 48 may be attached to the wheel frame 40 using brackets, fasteners and/or other suitable technique known by those skilled in the art.

A pair of fluid ports 50 may be disposed in fluid communication with the hydraulic actuator cylinder 47 of each wheel actuator 46. Hydraulic tubing 51 may be disposed in fluid communication with the respective fluid ports 50. A hydraulic pump and supply system (not illustrated), which may be conventional, may be disposed in fluid communication with the hydraulic tubing 51. The hydraulic pump and supply system may include hydraulic controls which facilitate flow of hydraulic fluid into one of the fluid ports 50 and from the other fluid port 50 to facilitate extension of the wheel frame 40 from the wheel frame housing 35, and opposite flow of the hydraulic fluid to facilitate retraction of the wheel frame 40 into the wheel frame housing 35.

The hydraulic controls for the hydraulic pump and supply system may be provided in any location which is accessible to an operator of the assembly 1. For example and without limitation, in some embodiments, the hydraulic controls for the hydraulic pump and supply system may be provided in the cab (not illustrated) of the towing vehicle 76. Accordingly, the hydraulic tubing 51 may be fitted with tubing connectors (not illustrated) which may be conventional and facilitate detachable fluid coupling of the hydraulic tubing 51 to the hydraulic pump and supply system.

As further illustrated in FIGS. 9 and 10, at least one wheel axle 41 may extend from the wheel frame 40. At least one wheel 42 may be provided on the wheel axle 41. Accordingly, by actuation of the wheel actuator 46, the wheel frame 40 may deploy the wheel 42 in an extended position (FIG. 9) to deploy the assembly frame 2 in the towing configuration, as illustrated in FIG. 5. The wheel frame 40 may deploy the wheel 42 in a retracted position (FIG. 10) to deploy the assembly frame 2 in the grooving configuration, as illustrated in FIG. 6 and will be hereinafter further described.

Figure 1:
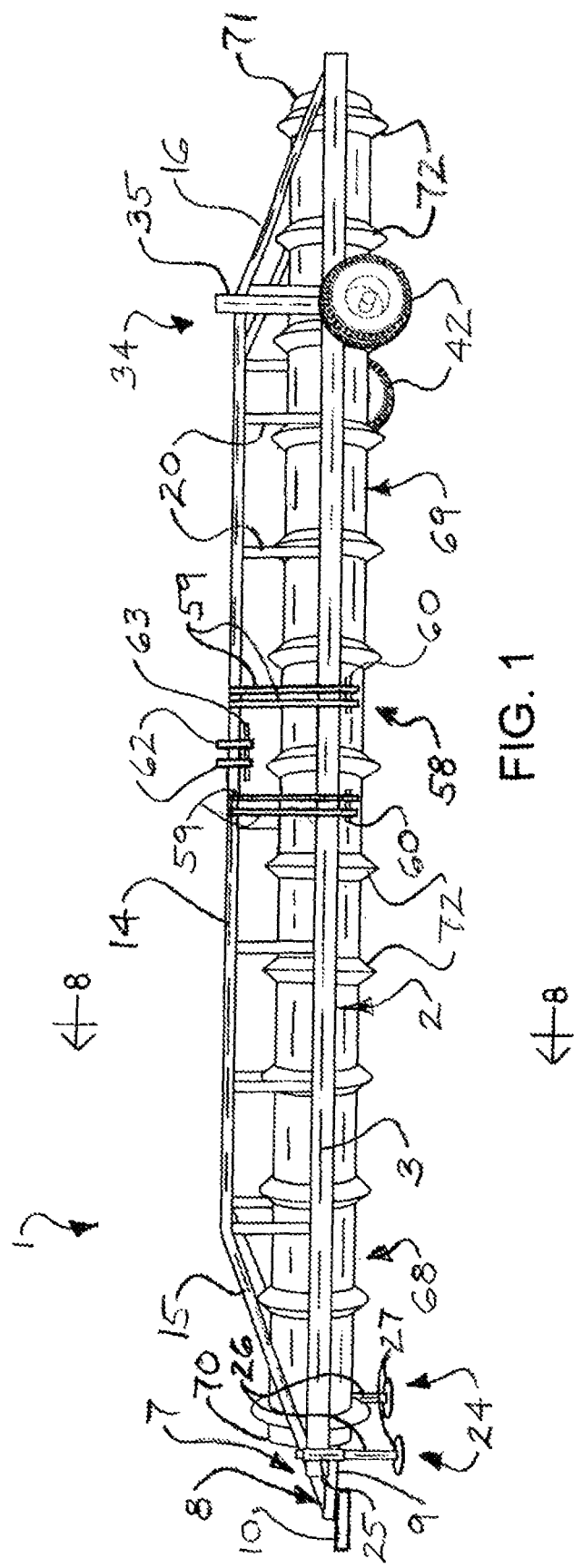
FIG. 1 is a front perspective view of an illustrative embodiment of the portable roller groover assembly.
Figure 4:
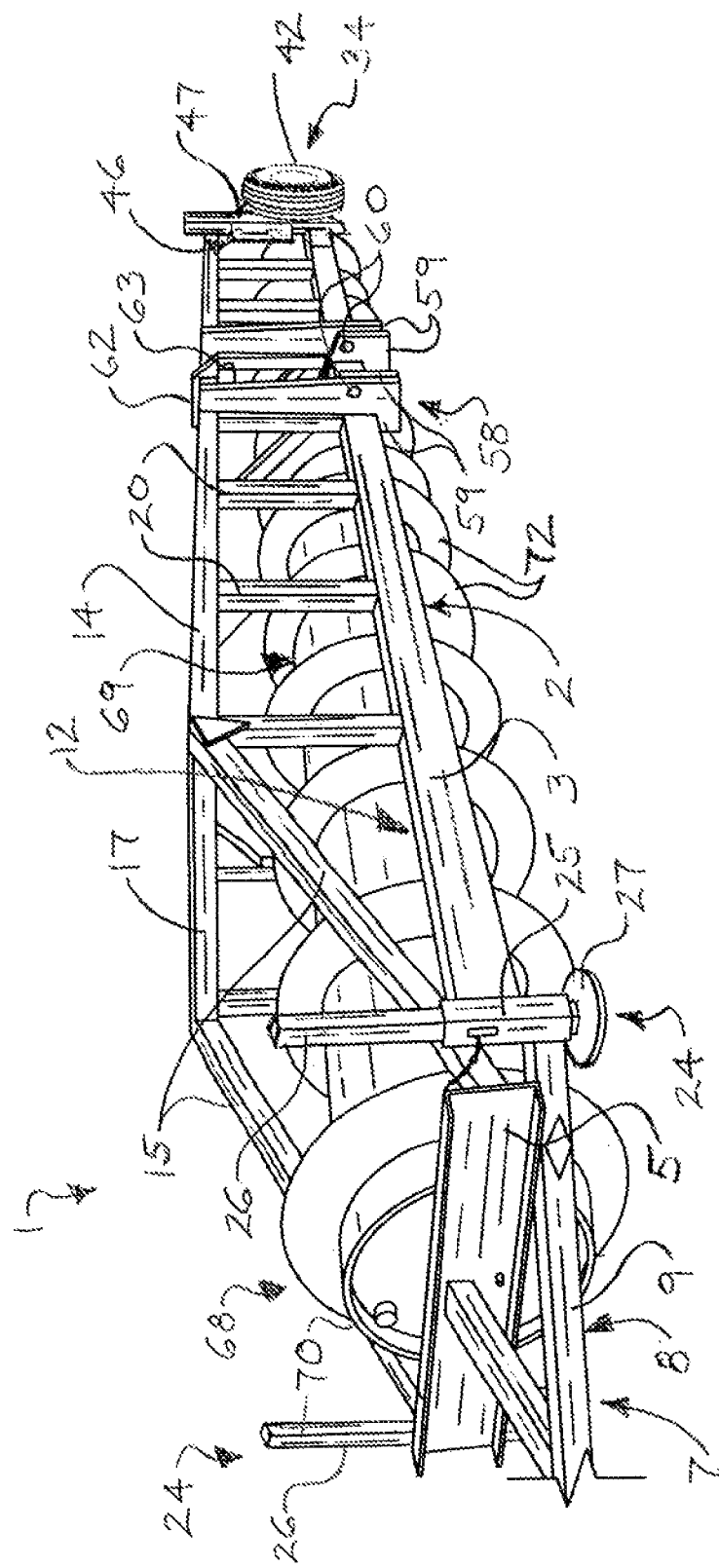
FIG. 4 is a front perspective view of the illustrative portable roller groover assembly deployed in a lowered, grooving configuration.

At least one, and typically, a pair of adjustable frame legs 24 may be provided on the assembly frame 2 at or proximate to the frame front 100. As illustrated in FIGS. 1 and 3, the adjustable frame legs 24 may be selectively deployable in a lowered, supporting position configured to support the assembly frame 2 in the towing configuration for storage of the assembly 1 and to facilitate coupling of the towing vehicle 76 to the towing hitch interface 7, as illustrated in FIG. 11. The adjustable frame legs 24 may be selectively deployable in a raised, stowage position, as illustrated in FIG. 4, for the towing and soil grooving operations of the assembly 1.

Each adjustable frame leg 24 may have any design which is suitable for the purpose of supporting the assembly frame 2 in the elevated position. Accordingly, in some embodiments, each adjustable frame leg 24 may include a frame leg collar 25 on a corresponding one of the front base frame member 3 and the rear base frame member 4. An elongated leg member 26 may telescopically extend through the frame leg collar 25. A foot plate 27 may terminate the lower end of the leg member 26 to support the leg member 26 on the ground in the extended position of the leg member 26.

The frame leg 24 may be adjustably mounted in the frame leg collar 25 according to the knowledge of those skilled in the art. For example and without limitation, in some embodiments, a pin opening (not illustrated) may extend through the frame leg collar 25. Multiple pin openings (not illustrated) may extend through the leg member 26 in vertically spaced-apart relationship to each other. A pin (not illustrated) may be extended through the pin opening in the leg collar 25 and one of the registering pin openings in the leg member 26 to secure the leg member 26 and support the assembly frame 2 at the selected length or height in the supporting position and the stowage position of the frame legs 24. In other embodiments, each frame leg 24 may utilize a crank-operated rack and pinion mechanism and/or other suitable device or mechanism to facilitate selective raising and lowering of the leg member 26 in the corresponding leg collar 25, as is known by those skilled in the art.

A towing hitch interface 7 may be provided on the assembly frame 2 at the leading frame end 104. The towing hitch interface 7 may be configured to facilitate coupling of the towing vehicle 76 to the assembly frame 2 in the towing configuration, as illustrated in FIG. 11. The towing hitch interface 7 may have any design which is suitable for the purpose. Accordingly, as illustrated in FIGS. 5-7, in some embodiments, the towing hitch interface 7 may include a front towing frame 8 having a pair of towing frame members 9 which may extend forwardly from the leading end frame member 5 of the assembly frame 2. A hitch plate 10 may extend forwardly from the towing frame members 9. At least one pin opening 11 (FIG. 7) may extend through the hitch plate 10. The pin opening 11 may be configured to receive at least one towing hitch pin 78 (FIG. 11) to couple the hitch plate 10 to a towing hitch 77 on the towing vehicle 76.

Figure 12:
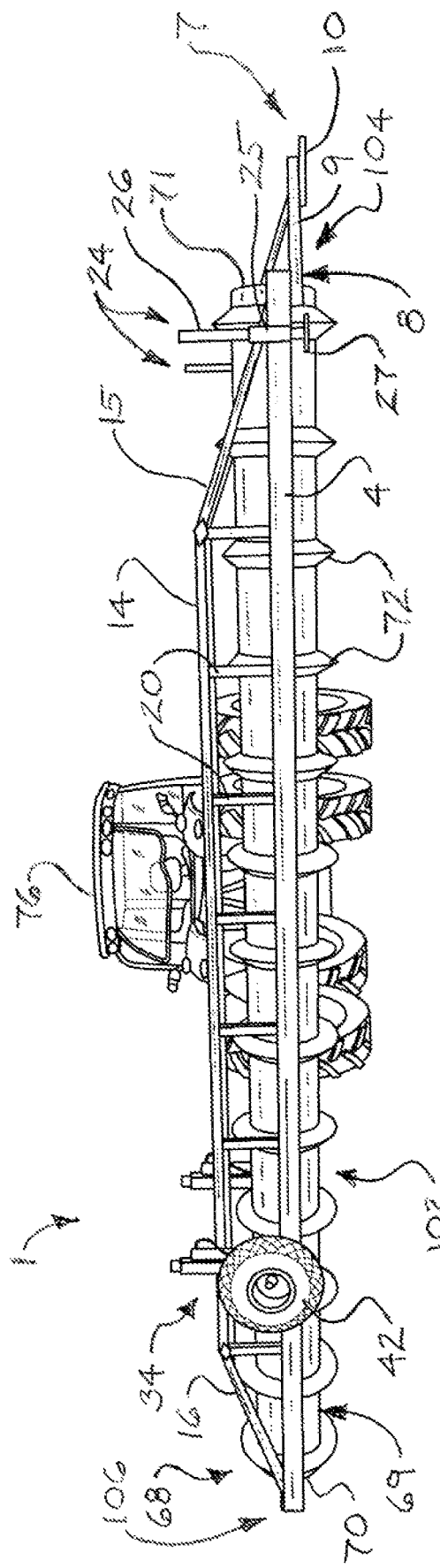
FIG. 12 is a rear perspective view of the illustrative portable roller groover assembly, coupled to the towing vehicle in the grooving configuration for implementation of the assembly in a soil grooving operation.
Figure 13:
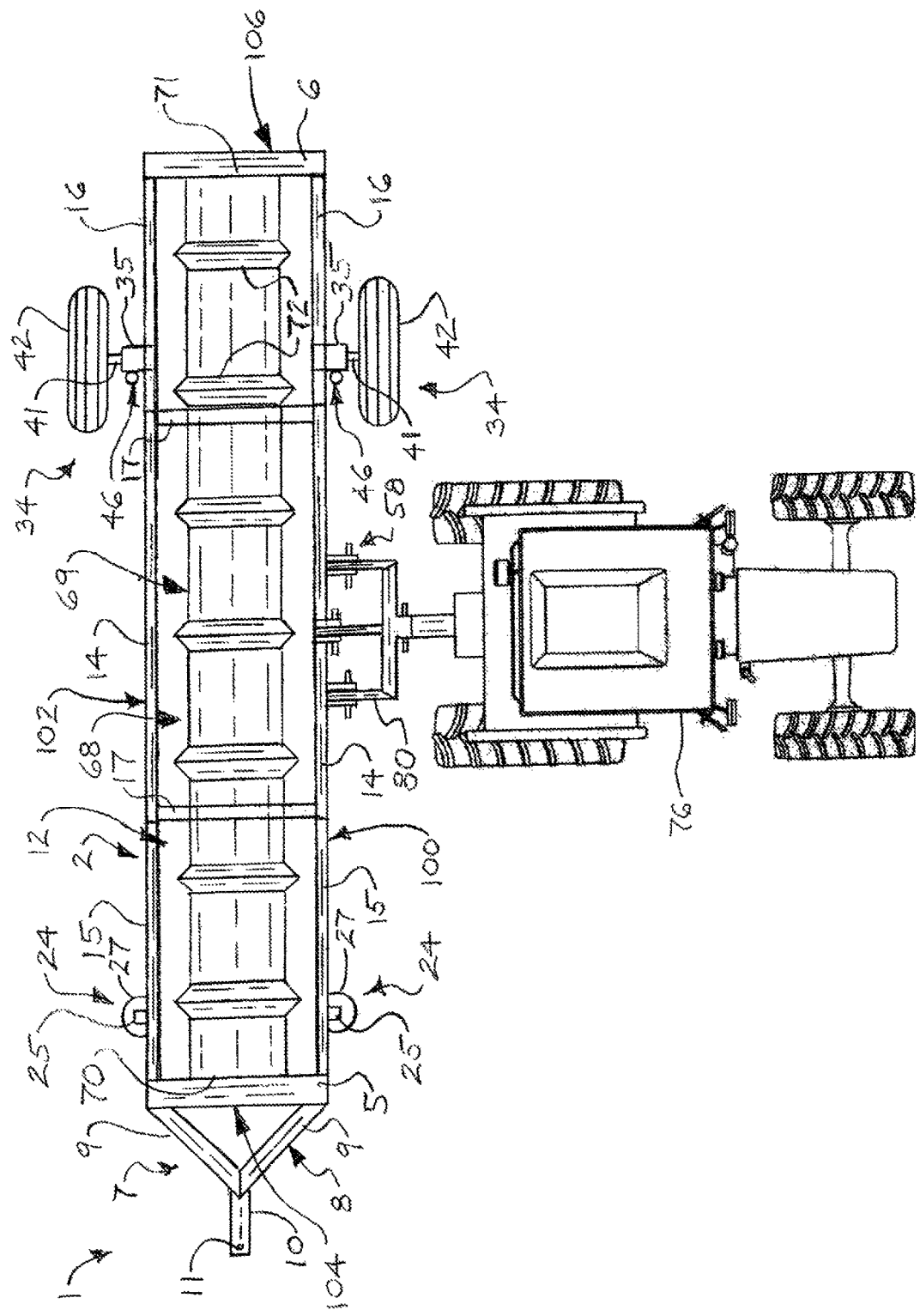
FIG. 13 is a top view of the illustrative portable roller groover assembly, coupled to the towing vehicle in the grooving configuration.

A grooving hitch interface 58 may be provided on the assembly frame 2 at the frame front 100. The grooving hitch interface 58 may be configured to facilitate coupling of the towing vehicle 76 to the assembly frame 2 in the grooving configuration, as illustrated in FIGS. 12 and 13. The grooving hitch interface 58 may have any design which is suitable for the purpose. Accordingly, as illustrated in FIGS. 5 and 6, in some embodiments, the grooving hitch interface 58 may include first and second pairs of elongated, parallel, spaced-apart side hitch plates 59 and a pair of spaced-apart upper hitch plates 62 on the assembly frame 2. The side hitch plates 59 may vertically span the front base frame member 3 and the corresponding upper frame member 14 of the assembly frame 2. The upper hitch plates 62 may be disposed between the pairs of side hitch plates 59 on the upper frame member 14.

As illustrated in FIGS. 1 and 7, a side hitch pin 60 may extend through registering pin openings (not illustrated) provided in each pair of side hitch plates 59. An upper hitch pin 63 may extend through registering pin openings (not illustrated) in the upper hitch plates 62. The side hitch pins 60 and the upper hitch pin 63 may facilitate pinned connection of a grooving hitch 80 (FIG. 13) to the side hitch plates 59 and the upper hitch plates 62 in typical coupling of the grooving hitch 80 to the grooving hitch interface 58.

A groover 68 may be provided on the assembly frame 2. The groover 68 may be disposed in the frame interior 12 of the assembly frame 2. The groover 68 may include an elongated groover body 69. In some embodiments, the groover body 69 may be generally cylindrical, as illustrated. The groover body 69 may be generally coextensive with the assembly frame 2 and may have a first groover end 70 and a second groover end 71. The first groover end 70 may be disposed at or proximate the leading frame member 5 and the second groover end 71 may be disposed at or proximate the trailing frame member 6 of the assembly frame 2.

Figure 15:
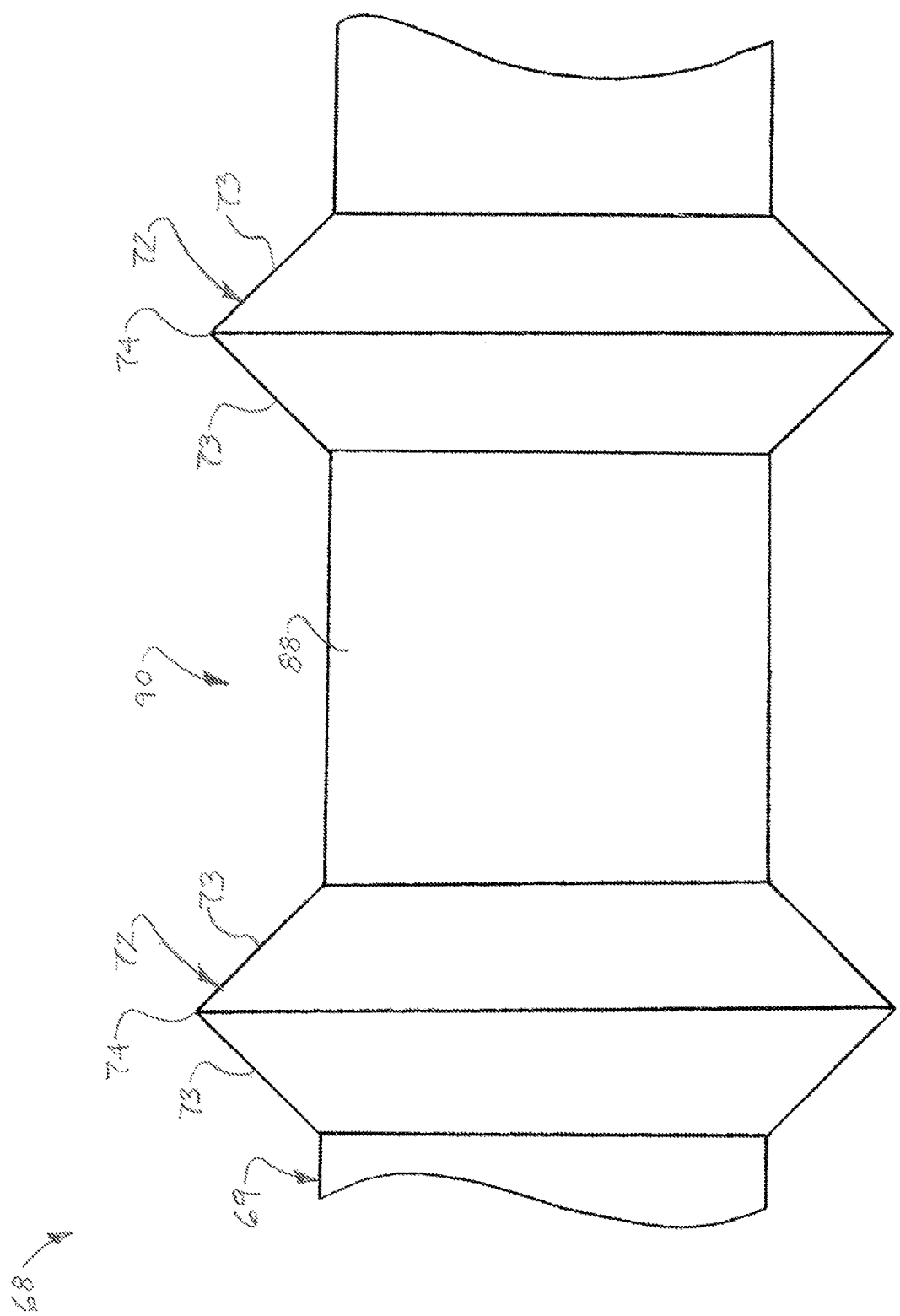
FIG. 15 is an enlarged sectional view of a portion of the groover showing a pair of spaced-apart groover disks and an inter-disk space between the groover disks.

Multiple groover disks 72 may extend outwardly from the groover body 69 in spaced-apart relationship to each other. As illustrated in FIG. 8, each groover disk 72 may be disposed at least partially beyond or below the frame plane 30 of the frame interior 12. In some embodiments, each groover disk 72 may protrude from the frame interior 12 of the assembly frame 2. As illustrated in FIG. 15, each groover disk 72 may have a pair of annular disk sides 73 which taper in an angled trajectory to an annular outer disk edge 74. The groover body 69 may have a vacant groover body segment 88 which extends between the adjacent groover disks 72 and is devoid of groover disks 72. The vacant groover body segment 88 may define an inter-disk space 90 between each pair of adjacent groover disks 72.

The groover body 69 of the groover 68 may be mounted in the frame interior 12 and attached to the assembly frame 2 according to the knowledge of those skilled in the art. Mounting techniques suitable for the purpose may include but are not limited to welding, brackets, bolts and/or other mechanical fasteners known by those skilled in the art.

Referring next to FIGS. 1, 3-6 and 11-14 of the drawings, in typical application, the assembly 1 may initially be towed from a storage location to a desired destination for use. As illustrated in FIG. 11, the assembly frame 2 may initially be maintained in a storage configuration for storage and to facilitate coupling of the towing vehicle 76 with the assembly frame 2 at the towing hitch interface 7. Accordingly, as illustrated in FIGS. 1, 3 and 5, the frame legs 24 may be deployed in the extended, supporting position with the foot plates 27 resting on the ground to support the frame front 100 of the assembly frame 2 at a selected height above the ground. The wheel units 36 may be deployed in the extended position (FIG. 9) to support the frame rear 102 and the remaining portion of the assembly frame 2 above the ground typically at the same height as the frame front 100.

The towing vehicle 76 may be operated in reverse to facilitate approach of the towing hitch 77 (FIG. 11) toward the towing hitch interface 7 at the leading frame end 104 of the assembly frame 2. Rearward operation of the towing vehicle 76 may continue until the towing hitch 77 on the towing vehicle 76 receives the hitch plate 10 of the towing hitch interface 7. The towing hitch pin 78 may be extended through the registering pin openings (not illustrated) in the towing hitch 77 and the hitch plate 10, respectively, and secured to complete the coupling operation. The frame legs 24 may then be deployed from the supporting position to the raised, stowage position as the wheel units 34 remain in the extended position (FIG. 9). The assembly 1 may be towed to the desired destination for use by forward operation of the towing vehicle 76.

Upon arrival at the destination, the frame legs 24 may again be deployed from the stowage position back to the lowered, supporting position until the foot plates 27 rest on the ground. The assembly frame 2 may be unhitched from the towing vehicle 76 typically by removing the towing hitch pin 78 and removing the hitch plate 10 from the towing hitch 77.

The towing vehicle 76 may be fitted with the grooving hitch 80 (FIG. 13) to facilitate coupling of the towing vehicle 76 to the assembly 1 and towing of the assembly 1 on the soil 84 (FIG. 4) in the grooving configuration. Accordingly, the towing vehicle 76 may initially be maneuvered forwardly of the frame front 100 of the frame assembly 2, with the grooving hitch 80 positioned in alignment with the grooving hitch interface 58. The towing vehicle 76 may then be operated in reverse typically until the grooving hitch 80 registers or aligns with the side hitch plates 59 and the upper hitch plates 62 of the grooving hitch interface 58. The side hitch pins 60 (FIG. 7) may be deployed to couple the grooving hitch 80 to the side hitch plates 59, and the upper hitch pin 63 may be deployed to couple the grooving hitch 80 to the upper hitch plates 62.

After coupling of the assembly 1 to the towing vehicle 76 at the grooving hitch interface 58 is complete, the frame legs 24 may be deployed from the supporting position to the stowage position. The wheel units 34 may be operated to raise the wheels 42 from the extended position (FIG. 9) to the retracted position (FIG. 10) as each wheel actuator 46 retracts the wheel frame 40 into the corresponding wheel frame housing 35.

The grooving hitch 80 and assembly 1 coupled thereto may be lowered until the groover disks 72 of the groover 68 penetrate the ground level 32 at the surface of the soil 84 in which the furrows are to be formed, as illustrated in FIG. 8. As illustrated in FIG. 14, the towing vehicle 76 may then be operated in the forward direction to tow the assembly 1 behind the towing vehicle 76. As the assembly 1 moves forwardly, the groover disks 72 of the groover 68 may form the respective furrows 85 in the soil 84. The furrows 85 may be used for planting, irrigation and/or other agricultural purposes. In some applications, the towing vehicle 76 may be operated in multiple passes across the soil 84 to form the furrows 85 across the desired surface area of the soil 84.

Upon completion of the soil grooving operation, the assembly 1 may be again deployed in the towing configuration with the frame legs 24 lowered to the supporting position on the ground and the wheel units 34 actuated from the retracted position (FIG. 10) back to the extended position (FIG. 9) to support the assembly frame 2 above the ground. The grooving hitch 80 may be uncoupled from the grooving hitch interface 58 and the towing vehicle 76 maneuvered from the frame front 100 to the leading frame end 104 of the assembly frame 2. The towing hitch 77 on the towing vehicle 76 may again be coupled to the hitch plate 10 of the towing hitch interface 7, as was heretofore described with respect to FIG. 11, and the assembly 1 towed to the desired location.

In storage of the assembly 1 at the storage location, the towing vehicle 76 may be uncoupled from the assembly frame 2. The frame legs 24 may be deployed back to the supporting position until subsequent use of the assembly 1.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A portable roller groover assembly for coupling to a towing vehicle in a towing configuration and alternative coupling to the towing vehicle in a grooving configuration for formation of grooves or furrows in soil, comprising:
   an elongated, rectangular assembly frame including:
      a frame front, a frame rear, a leading frame end and a trailing frame end;
      an elongated front base frame member at the frame front;
      an elongated rear base frame member at the frame rear;
      a leading end frame member extending between the front base frame member and the rear base frame member at the leading frame end;
      a trailing end frame member extending between the front base frame member and the rear base frame member at the trailing frame end, the front base frame member, the rear base frame member, the leading end frame member and the trailing end frame member disposed within a frame plane; and
      a frame interior formed by the front base frame member, the rear base frame member, the leading end frame member and the trailing end frame member;
   a pair of elongated, parallel, spaced-apart upper frame members carried by the front base frame member and the rear base frame member, respectively;
   a pair of wheel units carried by the front base frame member and the rear base frame member, respectively, of the assembly frame, each of the pair of wheel units including at least one wheel selectively deployable in an extended position to deploy the assembly frame in the towing configuration and a retracted position to deploy the assembly frame in the grooving configuration;
   a towing hitch interface carried by the leading end frame member of the assembly frame at the leading frame end, the towing hitch interface configured to facilitate coupling of the towing vehicle to the assembly frame in the towing configuration;
   a grooving hitch interface carried by the front base frame member and a corresponding one of the pair of upper frame members of the assembly frame at the frame front, the grooving hitch interface configured to facilitate coupling of the towing vehicle to the assembly frame in the grooving configuration, the grooving hitch interface comprising:
      first and second pairs of elongated, parallel, spaced-apart side hitch plates vertically spanning the front base frame member and the upper frame members of the assembly frame;
      a pair of spaced-apart upper hitch plates on the assembly frame, the upper hitch plates disposed between the first and second pairs of the side hitch plates on the upper frame member of the assembly frame;
      a pair of side hitch pins engaging the first and second pairs, respectively, of the side hitch plates; and
      an upper hitch pin engaging the pair of upper hitch plates, the side hitch pins and the upper hitch pin configured to facilitate pinned connection of a grooving hitch on the towing vehicle to the side hitch plates and the upper hitch plates in coupling of the grooving hitch to the grooving hitch interface; and
   a groover carried by the assembly frame and disposed in the frame interior, the groover having:
      a single elongated groover body disposed within the frame interior, the groover body coextensive with the assembly frame and including a first groover end at the leading frame end and a second groover end at the trailing frame end;
      a plurality of spaced-apart groover disks on the groover body and protruding from the frame interior and disposed at least partially beyond the frame plane of the assembly frame, each of the plurality of spaced-apart groover disks including a pair of disk sides tapering in an angled trajectory to an annular outer disk edge; and
      the groover body having a plurality of vacant groover body segments extending between the plurality of spaced-apart groover disks, each of the plurality of vacant groover body segments defining an inter-disk space between adjacent ones of the plurality of spaced-apart groover disks, the inter-disk space devoid of the plurality of spaced-apart groover disks.

2. The portable roller groover assembly of claim 1 further comprising a pair of sloped leading frame members angling from the pair of upper frame members, respectively, to the leading frame end of the assembly frame.

3. The portable roller groover assembly of claim 1 further comprising a pair of sloped trailing frame members angling from the pair of upper frame members, respectively, to the trailing frame end of the assembly frame.

4. The portable roller groover assembly of claim 1 wherein the groover body is cylindrical.

5. The portable roller groover assembly of claim 1 wherein the towing hitch interface comprises a pair of towing frame members extending forwardly from the leading end frame member of the assembly frame, at least one hitch plate extending from the pair of towing frame members and at least one pin opening extending through the at least one hitch plate.

6. The portable roller groover assembly of claim 1 further comprising at least one adjustable frame leg carried by the assembly frame and configured to support the assembly frame in the towing configuration.

7. A portable roller groover assembly for coupling to a towing vehicle in a towing configuration and alternative coupling to the towing vehicle in a grooving configuration for formation of grooves or furrows in soil, comprising:
an elongated, rectangular assembly frame including:
a frame front, a frame rear, a leading frame end and a trailing frame end;
an elongated front base frame member at the frame front;
an elongated rear base frame member at the frame rear;
a leading end frame member extending between the front base frame member and the rear base frame member at the leading frame end;
a trailing end frame member extending between the front base frame member and the rear base frame member at the trailing frame end, the front base frame member, the rear base frame member, the leading end frame member and the trailing end frame member disposed within a frame plane; and
a frame interior formed by the front base frame member, the rear base frame member, the leading end frame member and the trailing end frame member;
a pair of elongated, parallel, spaced-apart upper frame members carried by the front base frame member and the rear base frame member, respectively;
a pair of wheel units carried by the front base frame member and the rear base frame member, respectively, of the assembly frame, each of the pair of wheel units including at least one wheel selectively deployable in an extended position to deploy the assembly frame in the towing configuration and a retracted position to deploy the assembly frame in the grooving configuration;
a towing hitch interface carried by the leading end frame member of the assembly frame at the leading frame end, the towing hitch interface configured to facilitate coupling of the towing vehicle to the assembly frame in the towing configuration;
a grooving hitch interface carried by the front base frame member and a corresponding one of the pair of upper frame members of the assembly frame at the frame front, the grooving hitch interface configured to facilitate coupling of the towing vehicle to the assembly frame in the grooving configuration, the grooving hitch interface comprising:
first and second pairs of elongated, parallel, spaced-apart side hitch plates vertically spanning the front base frame member and the upper frame members of the assembly frame;
a pair of spaced-apart upper hitch plates on the assembly frame, the upper hitch plates disposed between the first and second pairs of the side hitch plates on the upper frame member of the assembly frame:
a pair of side hitch pins engaging the first and second pairs, respectively, of the side hitch plates; and
an upper hitch pin engaging the pair of upper hitch plates, the side hitch pins and the upper hitch pin configured to facilitate pinned connection of a grooving hitch on the towing vehicle to the side hitch plates and the upper hitch plates in coupling of the grooving hitch to the grooving hitch interface; and
a groover having;
a single elongated groover body carried by the assembly frame and disposed in the frame interior, the groover body coextensive with the assembly frame and including a first groover end at the leading frame end and a second groover end at the trailing frame end;
a plurality of spaced-apart groover disks extending from the groover body, each of the plurality of spaced-apart groover disks protruding from the frame interior and disposed at least partially beyond the frame plane of the assembly frame, each of the plurality of spaced-apart groover disks including a pair of disk sides tapering in an angled trajectory to an annular outer disk edge; and
the groover body having a plurality of vacant groover body segments extending between the plurality of spaced-apart groover disks, each of the plurality of vacant groover body segments defining an inter-disk space between adjacent ones of the plurality of spaced-apart groover disks, the inter-disk space devoid of the plurality of spaced-apart groover disks.

8. The portable roller groover assembly of claim 7 wherein each of the pair of wheel units comprises a wheel frame housing carried by each corresponding one of the front base frame member and the rear base frame member, a wheel frame telescopically extendable from the wheel frame housing and a wheel actuator carried by the wheel frame housing and operably engaging the wheel frame for telescopic extension and retraction of the wheel frame with respect to the wheel frame housing, and wherein the at least one wheel is carried by the wheel frame.

9. The portable roller groover assembly of claim 8 wherein the wheel actuator comprises a hydraulic actuator cylinder carried by the wheel frame housing and an actuator piston extendable from the hydraulic actuator cylinder and engaging the wheel frame.

10. The portable roller groover assembly of claim 7 further comprising a pair of adjustable frame legs carried by the assembly frame and configured to support the assembly frame in the towing configuration.

11. The portable roller groover assembly of claim 10 wherein each of the pair of adjustable frame legs comprises a frame leg collar carried by a corresponding one of the front base frame member and the rear base frame member, a leg member telescopically carried by the frame leg collar and a foot plate carried by the leg member.

\* \* \* \* \*